US008161428B2

(12) United States Patent
Yokogawa

(10) Patent No.: US 8,161,428 B2
(45) Date of Patent: Apr. 17, 2012

(54) METHOD OF PREDICTING RELIABILITY OF SEMICONDUCTOR DEVICE, RELIABILITY PREDICTION SYSTEM USING THE SAME AND STORAGE MEDIUM STORING PROGRAM CAUSING COMPUTER TO EXECUTE THE SAME

(75) Inventor: Shinji Yokogawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 378 days.

(21) Appl. No.: 12/385,777

(22) Filed: Apr. 20, 2009

(65) Prior Publication Data
US 2009/0265155 A1 Oct. 22, 2009

(30) Foreign Application Priority Data
Apr. 21, 2008 (JP) ................................. 2008-110084

(51) Int. Cl.
 *G06F 17/50* (2006.01)
(52) U.S. Cl. ................ 716/56; 716/51; 716/52; 716/54; 716/106; 716/112; 716/136
(58) Field of Classification Search ...................... 716/56
See application file for complete search history.

(56) References Cited

U.S. PATENT DOCUMENTS

| | | | | |
|---|---|---|---|---|
| 6,496,958 B1 * | 12/2002 | Ott et al. | ........................ | 700/110 |
| 7,386,815 B2 | 6/2008 | Bickford et al. | | |
| 2002/0032888 A1 * | 3/2002 | Ott et al. | ........................ | 714/724 |
| 2005/0071788 A1 * | 3/2005 | Bickford et al. | ................... | 716/4 |
| 2007/0099236 A1 | 5/2007 | Bickford et al. | | |
| 2007/0143720 A1 * | 6/2007 | Bickford et al. | ................... | 716/5 |
| 2008/0189664 A1 | 8/2008 | Bickford et al. | | |

FOREIGN PATENT DOCUMENTS

JP 2007-123894 5/2007

OTHER PUBLICATIONS

"Extending Integrated-Circuit Yield-Models to Estimate Early-Life Reliability" Thomas S. Barnett, et al., IEEE Translations on Reliability, vol. 52, 2003, pp. 296-300.

* cited by examiner

*Primary Examiner* — Paul Dinh
*Assistant Examiner* — Bryce Aisaka
(74) *Attorney, Agent, or Firm* — McGinn IP Law Group, PLLC

(57) ABSTRACT

An initial reliability of a semiconductor device is predicted before the design layout of a semiconductor product. A method of predicting the reliability of a semiconductor device according to the present invention: calculates the defect density of a plurality of wiring patterns on a wafer; extracts the critical area of a series of library elements formed of wiring patterns based on the defect density to determine the critical area value of each library element; determines a failure probability by wiring pattern from the result of a reliability test of the wiring pattern to form a correlation model from an expected value in which a defect is generated and which is obtained from the defect density and the failure probability of each wiring pattern; calculates the failure probability of each library element from the critical area value and the function of the correlation model; designs a layout of a semiconductor product with two library elements or more out of a series of the library elements combined together and calculates the reliability of the designed semiconductor device in consideration of the failure probability of the library elements combined together.

15 Claims, 8 Drawing Sheets

FIG. 3A
DEFECT
FIG. 3B
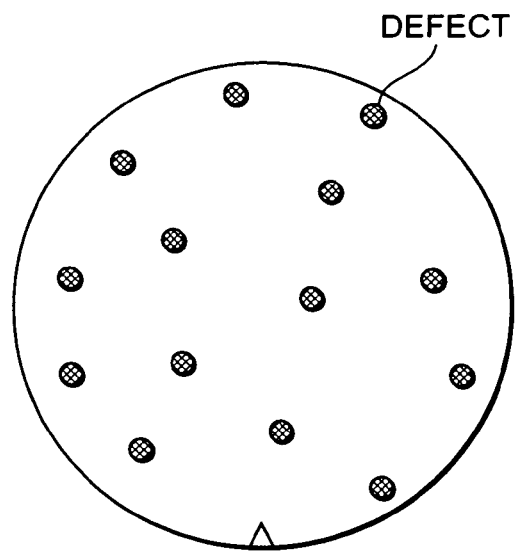
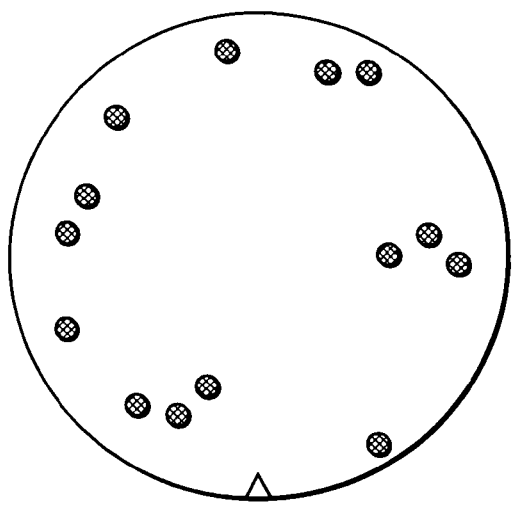
FIG. 4
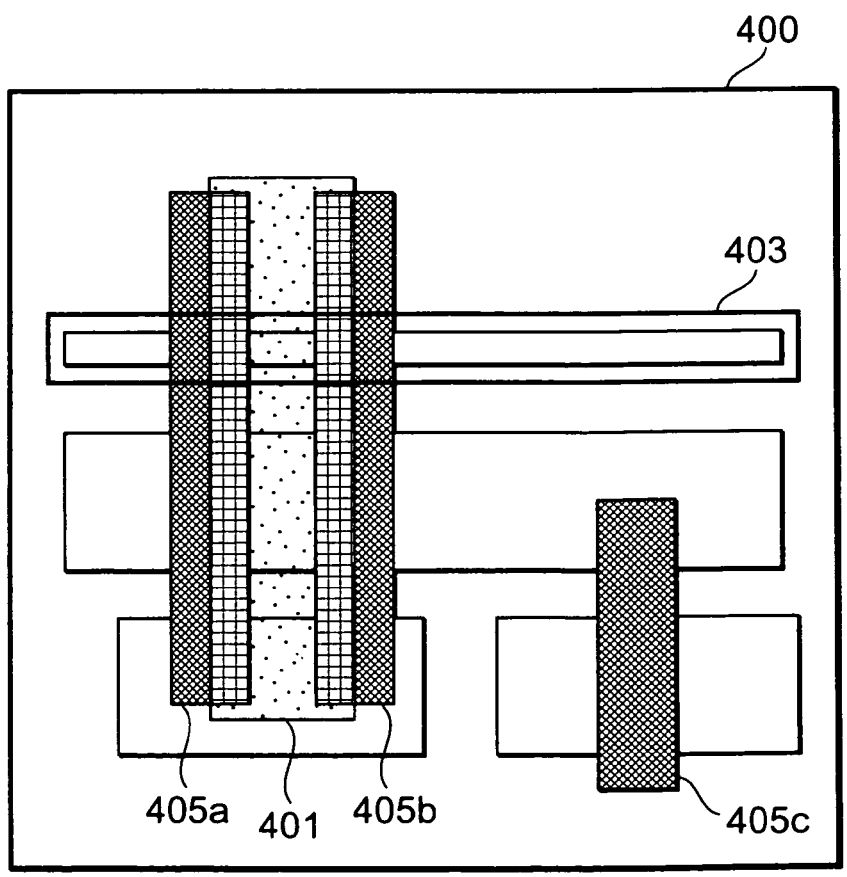

FIG. 5

| 11 | 21 | 31 | 41 |  | n1 |
|---|---|---|---|---|---|
| 12 | 22 | 32 | 42 |  |  |
| 13 | 23 | 33 | 43 |  |  |
| 14 | 24 | 34 | 44 |  |  |
|  |  |  |  |  |  |
| 1n | 2n |  |  |  | nn |

FIG. 6

| $F_{11}(t)$ | $F_{21}(t)$ | $F_{31}(t)$ | $F_{41}(t)$ | | $F_{n1}(t)$ |
|---|---|---|---|---|---|
| $F_{12}(t)$ | $F_{22}(t)$ | $F_{32}(t)$ | $F_{42}(t)$ | | |
| $F_{13}(t)$ | $F_{23}(t)$ | $F_{33}(t)$ | $F_{43}(t)$ | | |
| $F_{14}(t)$ | $F_{24}(t)$ | $F_{34}(t)$ | $F_{44}(t)$ | | |
| | | | | | |
| $F_{1n}(t)$ | | | | | $F_{nn}(t)$ |

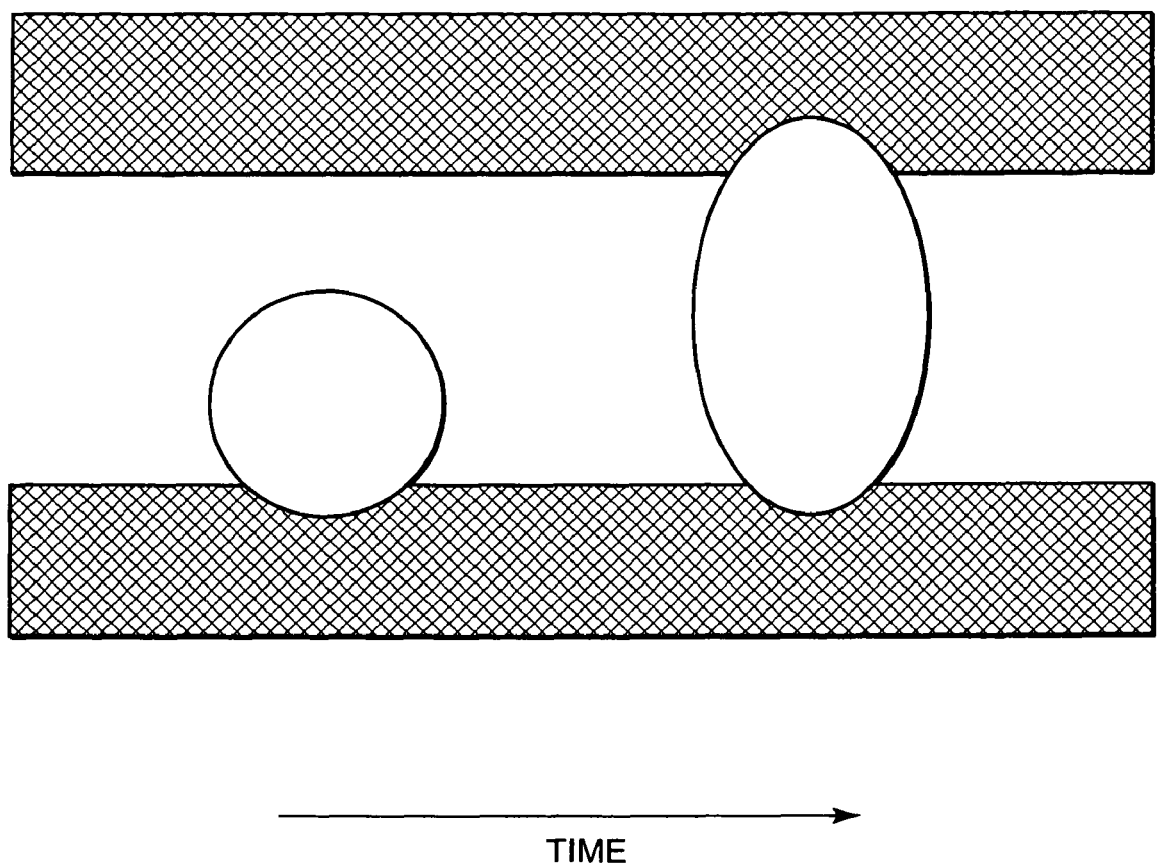

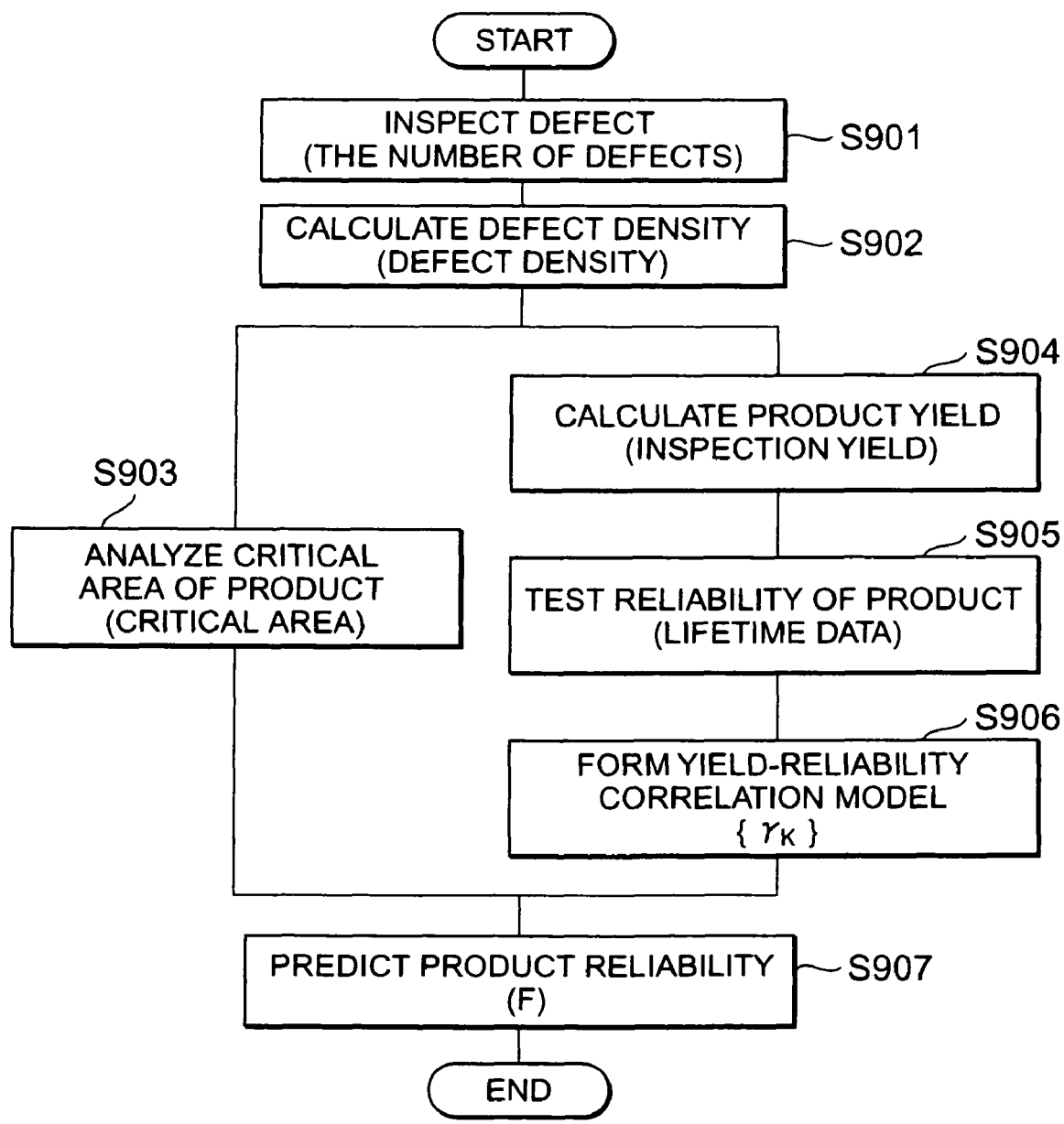

METHOD OF PREDICTING RELIABILITY OF SEMICONDUCTOR DEVICE, RELIABILITY PREDICTION SYSTEM USING THE SAME AND STORAGE MEDIUM STORING PROGRAM CAUSING COMPUTER TO EXECUTE THE SAME

BACKGROUND OF THE INVENTION

1. Field of the Invention

The present invention relates to a method and a system of predicting the reliability of a semiconductor device in which the early-life failure of the semiconductor device is predicted.

2. Description of the Related Art

The reliability of a semiconductor device such as a large scale integration (LSI) is divided into the following three parts: early-life failures occurring in an earlier stage after the device started to be used (operated); random failures occurring over a long period of use after that; and wear-out failures increasing with an intrinsic lifetime (service life) of a device.

Early-life failures occur due to a latent defect attributed to a manufacturing process being deteriorated by stress during use. A defect is formed in a chip due to a minute foreign particle adhering in a manufacturing process as a latent defect and results in failure of a device. Only a device having a latent defect fails and is gradually removed, hence a failure rate tends to decrease with time. Decreasing an early-life failure rate realizes a highly reliable semiconductor device.

The period of early-life failures is generally defined as half a year to one year. Screening such as a stress testing and a burn-in testing is introduced into a process to decrease a failure probability during an early-life failure period and improve quality.

A method of predicting an early-life failure rate of a semiconductor device is described in the reference of T. S. Barnett, et al. IEEE Trans. on Reliability vol. 52, p. 296 (2003). In this method, modeling for a relationship between evaluated reliability and yield for a product (semiconductor device) the design of which has been finished is performed. The early-life failure rate of the product can be predicted from the model and the yield of the product.

Incidentally, a method for designing a product in consideration of only the yield of the semiconductor device is described in Japanese Patent Laid-Open No. 2007-123894.

SUMMARY

According to the present invention, a method for predicting a reliability of a semiconductor device in which the early-life failure of the semiconductor device is predicted, the method includes: calculating a defect density for each of wiring patterns (S102); extracting a critical area for each of library elements composed of the wiring patterns based on the defect density for each of the wiring patterns (S201); calculating a critical area value for each of the library elements from the critical area for each of the library elements (S203); calculating an expected value of defect occurrence for each of the wiring patterns from the defect density for each of the wiring patterns (S104); determining a failure probability for each of the wiring patterns from a result of a reliability test for each of the wiring patterns (S105); forming a correlation model from the failure probability for each of the wiring patterns and the expected value of defect occurrence for each of the wiring patterns (S106); calculating a failure probability for each of the library elements from the critical area value for each of the library elements and a function of the correlation model (S107); designing a layout of the semiconductor device with a plurality of the library elements combined together (S108); and calculating a reliability of the semiconductor device based on the failure probability for each of the library elements combined together (S109).

According to the present invention, the failure probability of the library element can be calculated by forming the model predicting a failure occurring during the period of early-life failures and analyzing the critical area of each library element used for forming a specific product, based on an expected value of defect occurrence determined from the defect density of the wiring pattern affecting the yield and the reliability of the semiconductor product. For this reason, the initial reliability for the product combining the library elements together can be predicted without performing the reliability test for the product. Therefore the initial reliability for the product can be predicted before the product is completed.

According to the present invention, the computer can execute a program stored in a storage medium to realize the above method for predicting the reliability of a semiconductor device in which the early-life failure of the semiconductor device is predicted.

According to the present invention, there is provided a semiconductor-device reliability predicting system for predicting early-life failures of a semiconductor device includes: a defect density calculating unit (201) for calculating a defect density for each of wiring patterns; a critical area extracting unit (203) for extracting a critical area for each of library elements composed of the wiring patterns based on the defect density for each of the wiring patterns and calculating a critical area value for each of the library elements from the critical area for each of the library elements; a correlation model forming unit (205) for forming a correlation model from a failure probability for each of the wiring patterns and an expected value of defect occurrence for each of the wiring patterns; a failure probability calculating unit (207) for calculating a failure probability for each of the library elements from the critical area value for each of the library elements and a function of the correlation model; and a reliability calculating unit (209) for designing a layout of the semiconductor device with the plurality of the library elements combined together and calculating a reliability of the semiconductor device based on the failure probability for each of the library elements combined together. The failure probability for each of the wiring patterns is determined from a result of a reliability test for each of the wiring patterns. The expected value of defect occurrence for each of the wiring patterns is determined from the defect density for each of the wiring patterns.

According to the present invention, the initial reliability of a semiconductor product can be estimated before an actual design layout.

BRIEF DESCRIPTION OF THE DRAWINGS

The above and other objects, advantages and features of the present invention will be more apparent from the following description of certain preferred modes taken in conjunction with the accompanying drawings, in which:

FIGS. 3A and 3B are diagrams illustrating the distribution of defects on a wafer;

FIG. 4 is a schematic diagram of a library element;

FIG. 5 is an example of the layout of a semiconductor product in which library elements are combined together;

FIG. 6 is an example of the layout of a semiconductor product in which library elements are combined together;

FIGS. 9A and 9B' are diagrams illustrating the concept of reliability defect; and FIG. 10 is a flow chart illustrating a method of predicting reliability as a comparison example.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
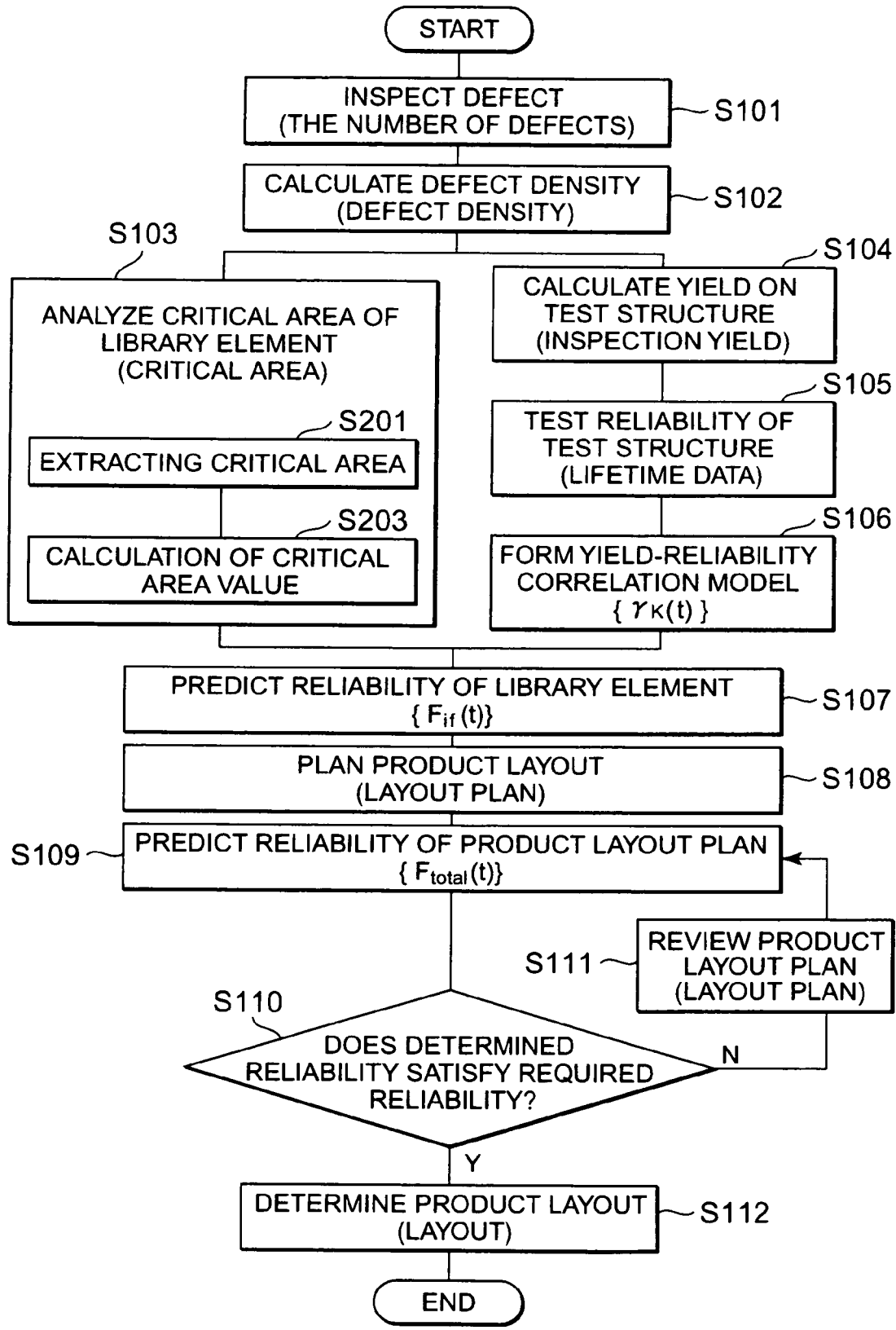
FIG. 1 is a flow chart illustrating a reliability prediction method according to the embodiment.
Figure 2:
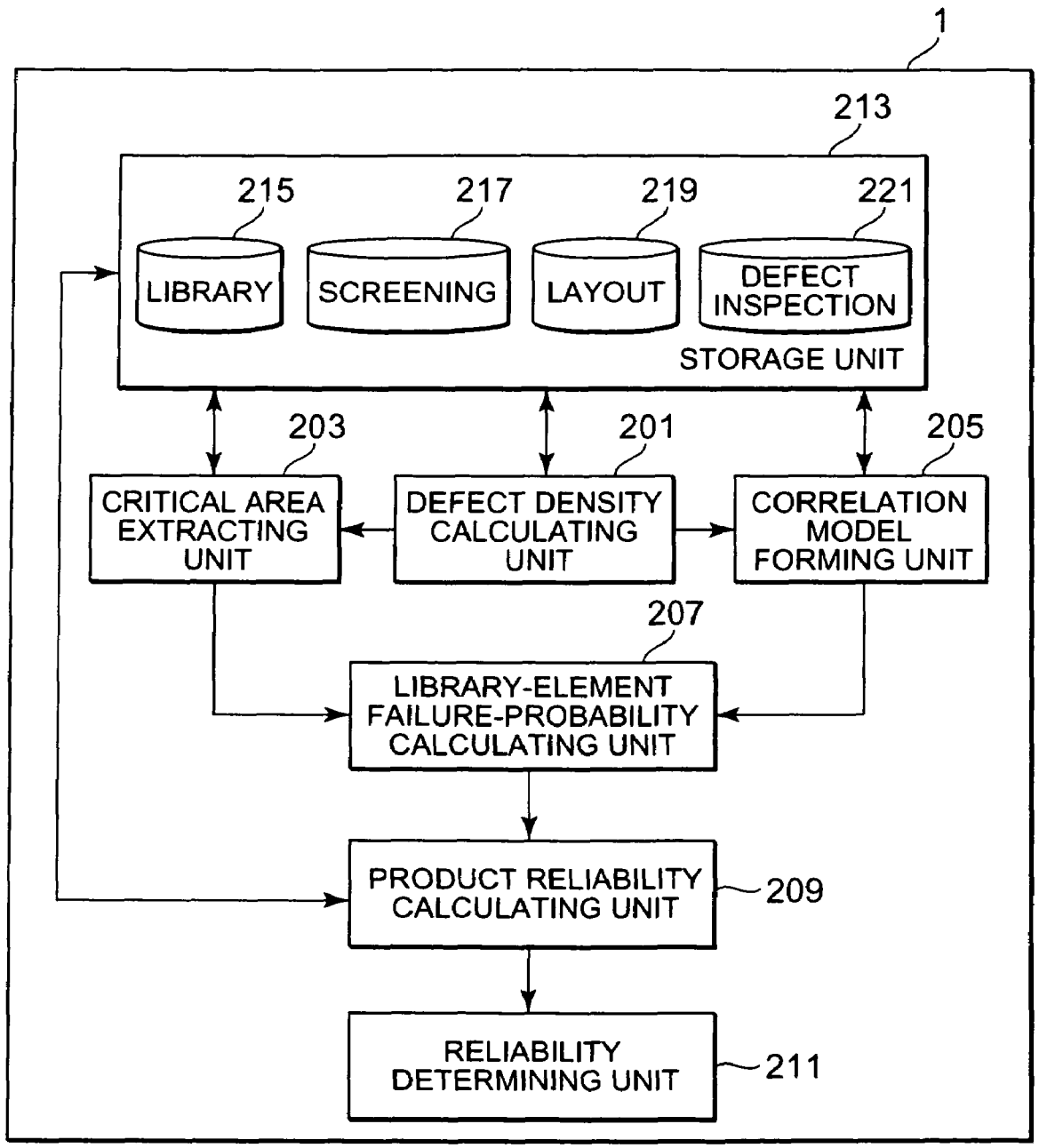
FIG. 2 is a block diagram of a reliability prediction system according to the embodiment.

A first embodiment of the present invention provides a semiconductor-device reliability predicting system for predicting early-life failures of a semiconductor device. FIG. 1 is a flow chart illustrating a reliability prediction method of the system. FIG. 2 is a block diagram of the system. The semiconductor-device reliability predicting system 1 includes: a defect density calculating unit 201 adapted to calculate the defect density of a plurality of wiring patterns on a wafer; a critical area extracting unit 203 adapted to extract the critical area of a series of library elements formed of wiring patterns based on the defect density and to calculate the critical area value of each library element using the critical area; a correlation model forming unit 205 adapted to determine a failure probability by wiring pattern from the result of reliability test of the wiring pattern, to calculate an expected value of defect occurrence determined from the defect density, and to form a correlation model from the expected value of defect occurrence and the failure probability of each wiring pattern; a library-element failure-probability calculating unit 207 adapted to calculate the failure probability of each library element from the critical area value and the function of the correlation model; and a product reliability calculating unit 209 adapted to design a layout of a semiconductor device with two library elements or more out of a series of the library elements combined together and to calculate reliability of the semiconductor device including the designed library elements in consideration of the failure probability of the library elements combined together.

The term "critical area" refers to an index quantitatively denoting the degree to which a defect such as a foreign particle causes short circuit or disconnection in each process of an LSI manufacturing process. The short circuit is caused only when the center of the foreign particle is positioned in a specific range. The area of the specific range is referred to as "critical area".

The reliability predicting system 1 also includes a reliability determining unit 211 adapted to determine whether a calculated reliability satisfies a predetermined reliability.

The reliability predicting system 1 further includes a storage unit 213. The storage unit 213 includes a library 215, a screening 217, a product layout 219 (illustrated as "LAYOUT" in FIG. 2) and a defect inspection 221.

Each library element is a previously designed device including a series of integrated circuits wired together to execute a specific function. Each library element of a series of library elements is added to an inventory by circuit type and organized so that a plurality of the circuit type are mixed and aligned to enable forming a variety of different semiconductor products. The library element may be formed of LSI circuits. As the library element, there can be exemplified a system LSI circuit and an application specific integrated circuit (ASIC).

The library 215 stores a library made of a series of library elements formed of wiring patterns. The library 215 may receive a library element formed outside or store a library element formed by the reliability predicting system 1.

The screening 217 stores results of reliability test conducted by the wiring pattern of the library element. A screening method includes a burn-in testing and a stress testing.

The product layout 219 stores the layout of the semiconductor device designed by the product reliability calculating unit 209.

The defect inspection 221 stores results of inspecting a defect existing in the wiring pattern formed on a wafer at the manufacturing process of a semiconductor device. A defect inspection method includes an optical inspection method and a scanning electron microscope (SEM) method. The optical inspection method optically picks up an image on a wafer surface and identifies a defective location by image analysis. The SEM inspection method is such that an electron beam converged to a point is scanned on a wafer formed on a circuit pattern, the obtained SEM images are compared with each other to be inspected, detecting and counting defects existing in the circuit pattern. The defect inspection 221 stores the number of defects as a result of the defect inspection.

The defect density calculating unit 201 refers to the result of the defect inspection stored in the defect inspection 221 and calculates a defect density from the number of defects, the spatial defect distribution and the area where the inspection is conducted.

The critical area extracting unit 203 extracts the critical area from each library element stored in the library 215 based on the defect density calculated by the defect density calculating unit 201 and calculates the critical area value of each library element using the extracted critical area from each library element.

The critical area value is stored in the library 215 correspondingly with each library element.

The correlation model forming unit 205 calculates a failure probability of each of the wiring patterns from the result of reliability test of each of the wiring patterns stored in the screening 217 and calculates an expected value of defect occurrence for each of the wiring patterns using the defect density calculated by the defect density calculating unit 201. The correction model forming unit 205 also forms the correlation model from the expected value of defect occurrence and the failure probability of each of the wiring patterns.

The product reliability calculating unit 209 calculates the reliability of the semiconductor device including the selected library elements in consideration of the failure probability of the library elements forming the layout of the semiconductor device based on the layout of the semiconductor device stored in the product layout 219. Specifically, the reliability of the semiconductor device is calculated as a joint probability of the failure probability of the combined library elements in designing the semiconductor device.

The calculated reliability may be stored correspondingly with the layout of the semiconductor device.

In the present embodiment, the term "joint probability" refers to the probability of two events or more occurring together. The term "joint" is not always limited to the meaning of a temporal simultaneity. The joint probability is normally represented by a product of the failure probability of each library element, but may be represented by an equation in which the failure probability of each library element is weighted.

The reliability predicting system 1 includes a display unit, an operation unit and an output unit which are not shown. The reliability predicting system 1 receives operation instructions from a user through the operation unit. The reliability predicting system 1 displays operations on the display unit and the user can confirm instructed operations on the display unit. The reliability predicting system 1 can output the result obtained by operations to the output unit.

The reliability predicting system 1 may be connected to a defect inspection apparatus, a CAD device and other terminals through a network or introduced into a device or a terminal.

The CAD device can draw a two-dimensional plan view with layer conception. For this reason, designing a product layout becomes easy when the reliability predicting system 1 is introduced or connected to the CAD device. In addition, when the reliability predicting system 1 is introduced or connected to a defect inspection apparatus, the speed of a series of reliability diagnosis flows can be increased. That leads to allowing an effective product design.

A reliability diagnosis method using the reliability predicting system 1 is described below with reference to FIG. 1. The method includes the steps of: calculating a defect density of a plurality of wiring patterns on a wafer (S102); extracting the critical area of a series of library elements formed of wiring patterns based on the defect density to determine the critical area value of each library element (S103); determining a failure probability by wiring pattern from the result of reliability test of the wiring pattern and forming a correlation model from an expected value of defect occurrence determined from the defect density and the failure probability of each wiring pattern (S104 to S106); calculating the failure probability of each library element from the critical area value and the function of the correlation model (S107); and designing a layout of a semiconductor device with two library elements or more out of a series of the library elements combined together and calculating the reliability of the designed semiconductor device in consideration of the failure probability of the library elements combined together (S108 and S109). Each step is described in detail below.

A defect on a wafer generated at a process is inspected using an optical microscope or a scanning electron microscope (S101). A defect is inspected by counting the number of defects generated on a wafer. Typically, a plurality of wafers is inspected to determine an average value. Specifically, the term "defect" refers to a conductive foreign particle such as metal existing on a wafer and appearance fault.

Abnormality in the defect inspection can be determined based on the number of defects detected by an inspection apparatus and a density management index. When the number of defects exceeds a predetermined standard value, it is determined that the device has an abnormality, the defect is magnified and imaged by a reviewing device such as an optical microscope or a scanning electron microscope based on the defect coordinate information detected by the inspection apparatus to obtain detailed information on size, shape, texture of the defect or to conduct a detailed inspection such as elementary analysis and cross-section observation, thereby identifying the generation and contents of nonconformity.

The defect density of a plurality of wiring patterns on a wafer is calculated (S102). The defect density is calculated from the number of defects and the spatial defect distribution obtained from the defect inspection and the area where the inspection is conducted. FIGS. 3A and 3B are diagrams illustrating the distribution of defects on the wafer. If the spatial defect distribution is uniform (refer to FIG. 3A) in calculating the defect density, Poisson distribution may be used. If it is not regarded as uniform (refer to FIG. 3B), a distribution whereby to enable describing clustering defects such as negative binomial distribution may be used.

In the step S103, the critical area of a series of library elements composed of wiring patterns is extracted based on the defect density (S201), and the critical area value of each library element is calculated using the critical area (S203).

Each library element is a previously designed device including a series of integrated circuits wired together to execute a specific function. Each library element of a series of library elements is added to an inventory by circuit type and organized so that the circuit type is mixed and aligned to enable forming a variety of different semiconductor devices.

The critical area represents as a region an aggregation of places where the existence of a defect may cause a failure. For example, the adhesion of a foreign particle between the wirings may short-circuit the wirings. This depends on the distance between the wirings and the size of the foreign particle. The foreign particle is presumed circular and its size is taken as diameter. Therefore, the critical area is represented by a function of size of the foreign particle. The critical area value represents the area value of the critical area.

Predicting a yield in consideration of a frequency in which a foreign particle occurs by size (a foreign particle size distribution) and a probability in which the foreign particle leads to a critical defect is referred to as critical area analysis. This method determines a critical probability in the case where a foreign particle occurs at random as an area ratio of the critical area in the library element using an actual measurement result of a particle size distribution of a foreign particle occurring at a production line or process in a defect inspection and the library element. Then this method calculates the yield of the library element by the product of the critical probability of the foreign particle by size and the occurrence frequency of the foreign particle. Consequently the yield of the library element can be calculated from the critical area value.

The critical area analysis can be performed using the Monte Carlo method widely used heretofore, a graphic operation method or a method in which the above methods are improved.

In the graphic operation method, a critical area is extracted as a portion where adjacent wirings are superposed together when a wiring figure is thickened by a radius of the foreign particle.

In the Monte Carlo method, a ratio of the foreign particles causing a short circuit to all foreign particles is calculated when a large number of (virtual) foreign particles with a random diameter are caused to occur. The short circuit is regarded when the foreign particle connects adjacent wirings together. The ratio becomes approximately equal to a value in which the critical area is normalized by the area of the library element.

A failure probability by wiring pattern is determined from the result of reliability test of the wiring pattern to form a correlation model from an expected value in which a defect is generated and which is obtained from the defect density and the failure probability of each wiring pattern. A defect density representing the density of the number of defects causing failure on a wiring pattern is calculated (S102).

The correlation model may include: a first correlation model formed of a short-circuit defect density representing the density of the number of defects which may cause a short-circuit failure due to the adhesion of a foreign particle between the wirings and a failure probability of each wiring pattern; and a second correlation model formed of an open defect density representing the density of the number of defects which may cause an open failure due to the adhesion of a foreign particle to the wiring and a failure probability of each wiring pattern. In this case, the failure probability of each library element may be calculated as a joint probability of the first and the second correlation model.

Specifically, a mixed probability (inspection yield) of the number of critical defects causing a failure on a wiring pattern being a test structure is calculated from the defect density (S104). A reliability test is conducted using the test structure to observe the transition of occurrence of reliability failure as time elapses (S105). A wafer different in yield is subjected to the reliability test to form a yield-reliability correlation model (S106).

Failure is classified by cause into two categories: short-circuit failure; and open-circuit failure.

The short-circuit failure is a short-circuit defective caused by the adhesion of a foreign particle between wirings or the like.

The open-circuit failure is an open-circuit defective caused by the adhesion of a foreign particle on a wiring or the like.

FIG. 4 is a schematic diagram of a library element 400. The library element 400 is provided with wirings 405a, 405b and 405c.

The library element 400 includes a short-circuit critical area 401 (mode A). The short-circuit critical area 401 refers to a place where the existence of a defect creates a short-circuit yield. Since the distance between the wirings 405a and 405b is short, the existence of a defect therebetween causes a short circuit between the wirings 405a and 405b. For this reason, a space between the wirings 405a and 405b is a critical area. On the other hand, the distance between the wirings 405b and 405c is long, so that, even if a foreign particle adheres thereto, the foreign particle does not seem to be long enough to connect the wiring 405b to the wiring 405c. Consequently, the foreign particle seldom causes a short circuit between the wirings 405b and 405c, which does not create a critical area.

The library element 400 includes an open critical area 403 (mode B). The open critical area 403 refers to a place where the existence of a defect creates an open yield. In other words, the open critical area 403 means a defective area due to the adhesion of a foreign particle on either the wiring 405a or the wiring 405b.

In step S107, a prediction model representing the reliability of each library element is formed from a statistical model combining the critical area value determined from the critical analysis in step S103 and the yield-reliability correlation model formed in step S106. The yield of each library element is calculated from the critical area value. Thereby, a failure probability for each of the library elements can be calculated from the yield of each library element and the yield-reliability correlation model.

In step S108, two library elements or more are selected from the library to plan the layout of a semiconductor product. In step S109, the reliability of the semiconductor device including the selected library elements is calculated in consideration of the failure probability of each library element selected.

Specifically, the layout of a semiconductor product in which library elements are combined together is planned (S108). FIG. 5 is an example of the layout of a semiconductor product in which library elements are combined together. A square indicates a library element. The product is formed of n×n library elements.

FIG. 6 is also an example of the layout of a semiconductor product in which library elements are combined together. In FIG. 6, a failure probability of each library element illustrated in FIG. 5 is shown.

In step S109, the reliability of the planned product layout is calculated using the failure probability of each library element determined in step S107.

In step S110, a determination is made as to whether the determined reliability of the product layout satisfies a reliability required for the product. If the calculated reliability does not satisfy a predetermined reliability (NO, in S110), a product layout plan is reviewed (S111). For example, an element library low in reliability is replaced with an element library high in reliability. The process returns to step S108. Two library elements or more are selected again from a series of the library elements and the reliability of the semiconductor product including the selected library elements is calculated from the failure probability of each library element (S109).

Thus, steps S109 to S111 are repeated to change the combination of library elements until the predetermined reliability is satisfied. If the calculated reliability satisfies a required reliability (YES, in S110), the product layout is determined (S112).

There is described below an example of a reliability calculating method used in the reliability prediction method according to the present embodiment.

The following is used as a method of calculating a defect density in counting the number of defects on a wafer using an optical defect inspection method or the like.

If defects are distributed at random on a wafer, the distribution of the number of defects included in an assumed area (corresponding to a test structure or chip size) is represented by the following Poisson distribution. The expected value of the averaged number of defects per area is taken as Pr. Probability in which k defects occur is expressed by the following equation.

$$Pr(X=k) = \frac{e^{-\lambda} \cdot \lambda^k}{k!} \quad (k=0,1,\ldots,n) \qquad \text{[Equation 1]}$$

The occurrence of yield failure or reliability failure means that the number of defects is one or more. That is to say, yield corresponds to probability occurring when the number of defects is zero, which is represented by the following equation.

$$Pr(X=0) = \frac{e^{-\lambda} \cdot \lambda^0}{0!} = e^{-\lambda} \qquad \text{[Equation 2]}$$

Where, $\lambda$ is the expected value of the number of defects occurring. Thus, the relation $\lambda_{inspection}$ between the expected value of the number of defects occurring and the yield $Y_{inspection}$ is represented by the following equation.

$$Y_{inspection} = \exp(-\lambda_{inspection}) \qquad \text{[Equation 3]}$$

It is assumed that the number of defects $\lambda_{inspection}$ related to yield per area has a simple proportional relationship with the number of defects $\lambda_{latent}(t)$ related to reliability. Since the reliability failure occurs as time elapses, if it is assumed that $\lambda_{latent}(t) = \gamma(t) \lambda_{inspection}$, the relationship between the yield and the reliability is expressed by the following equation.

$$Y_{latent}(t) = \exp(-\lambda_{latent}(t)) = \exp(-\gamma(t) \cdot \lambda_{inspection}) = Y_{inspection}^{\gamma(t)} \qquad \text{[Equation 4]}$$

Since a reliability yield corresponds to reliability, an unreliability function representing a failure probability is expressed by an equation 5. In particular, the number of defects occurring is very small in an ordinary semiconductor process, so that the unreliability function is represented by an equation 6 from a first approximation.

$$F(t) = 1 - Y_{latent}(t) = 1 - \exp(-\gamma(t) \cdot \lambda_{inspection})$$ [Equation 5]

$$F(t) \cong 1 - \{1 - \gamma(t) \cdot \lambda_{inspection}\} = \gamma(t) \cdot \lambda_{inspection}$$ [Equation 6]

The correlation coefficient $\gamma(t)$ between the yield and the reliability is determined by Equation 6 from cumulative failure probability $F(t)$ and $\lambda_{inspection}$ as follows.

$$\gamma(t) \cong \frac{F(t)}{\lambda_{inspection}}$$ [Equation 7]

Figure 7:
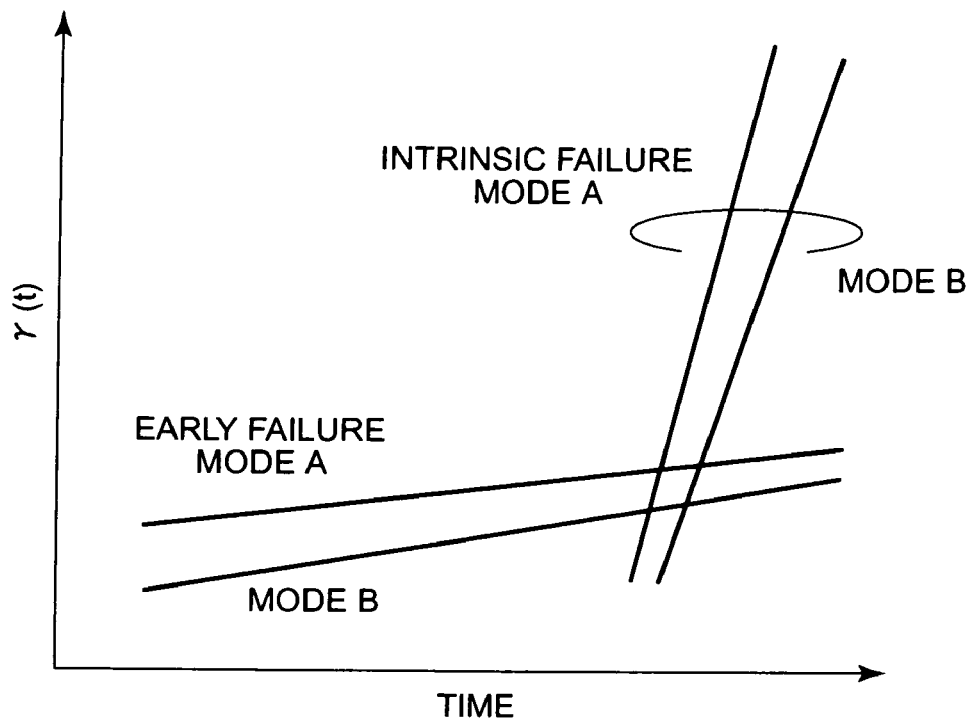
FIG. 7 is a graph illustrating a yield-reliability correlation model.

$F(t)$ represents the reliability as a function of time. $F(t)$ may be obtained from the results of the reliability tests for a plurality of the wiring patterns or wafers which have different defect density. Therefore the correlation coefficient $\gamma(t)$ can be determined with respect to time from $F(t)/\lambda_{inspection}$. FIG. 7 is a graph in which $\gamma(t)$ is plotted as a function of time to represent a yield-reliability correlation model. Obtaining the result of reliability test by wiring patterns (circuit pattern) with time provides the correlation between $\gamma(t)$ and time as illustrated in FIG. 7. According to the calculation method, the yield-reliability correlation model can be formed not only for early-life failures but also for intrinsic failures, as illustrated in FIG. 7.

The defect density includes a short-circuit defect density being a critical defect (failure) due to the adhesion of a foreign particle between wirings and an open defect density being a critical defect due to the adhesion of a foreign particle to the wiring. The correlation coefficient $\gamma(t)$ can be calculated based on the short-circuit defect density and the open defect density.

Thus, determining $\gamma(t)$ by failure mode enables unreliability by mode to be represented using Equation 6. If the unreliability (failure probability) of the library element in FIG. 6 is shown by a joint probability of the mode A (short-circuit defect) and the mode B (open defect), the unreliability is represented by the following equation.

$$F_{lib}(t) = 1 - (1 - F_A(t)) \cdot (1 - F_B(t)) = 1 - (1 - \gamma_A(t) \cdot \lambda_{inspection}) \cdot (1 - \gamma_B(t) \cdot \lambda_{inspection})$$ [Equation 8]

The reliability of a system formed of a plurality of library elements (normal probability) is a joint probability in which all respective components are normally operated.

For this reason, if the reliability of the library element "i" determined by Equation 8 is $(1 - F_i(t)) = (1 - F_{lib}(t))$, the unreliability for a product $F_{total}(t)$ can be calculated by Equation 9.

$$F_{Total}(t) = 1 - \prod_{i=1}^{n}(1 - F_i(t))$$ [Equation 9]

The effect of the present embodiment is described below. According to the method of the present embodiment, the failure probability of the library element can be calculated by forming the model predicting the transition of failure occurring during the period of early-life failures and analyzing the critical area of each individual library element used for forming a specific product based on the defect density affecting the yield and the reliability of the semiconductor product. For this reason, the library elements are connected together to allow predicting the influence of the library elements on the initial reliability of a semiconductor product before design layout.

According to the method of the present embodiment, a determination can be made as to whether a result of predicting reliability satisfies reliability required for a product. Consequently, a product layout plan can be reviewed and a product layout with a sufficient initial reliability can be realized.

Figures 8A, 8B, 8C:
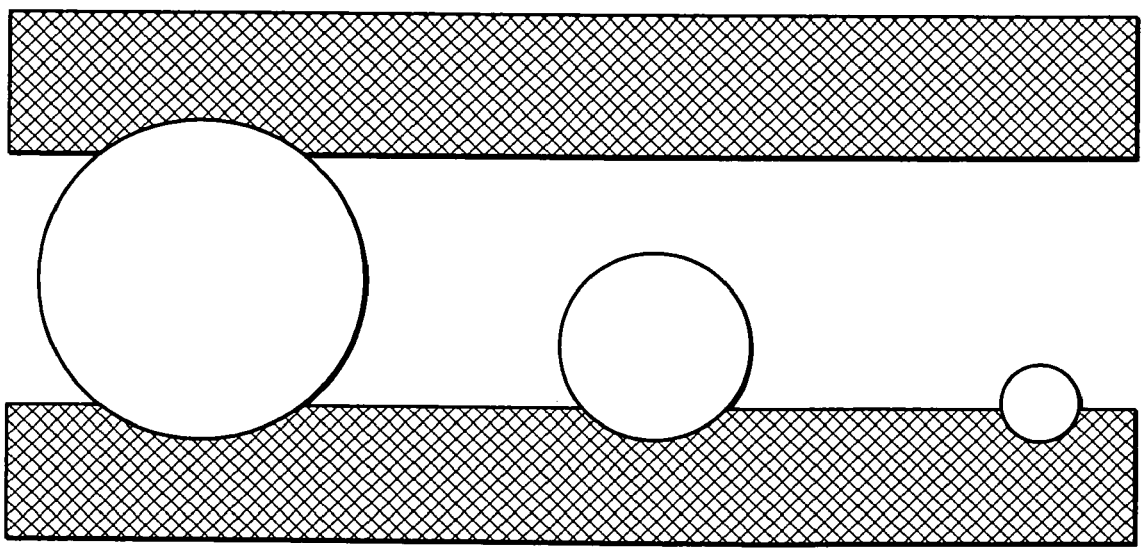
FIGS. 8A to 8C are a diagram illustrating the concept of yield defect.

FIG. 8 is a diagram illustrating the concept of yield defect. The figure illustrates conductive foreign particles adhering between the wirings. In FIG. 8A, current flows between the wirings through the foreign particle to cause a short-circuit defective. This state is referred to as "yield defect". On the other hand, in FIGS. 8B and 8C, the foreign particles are in contact only with one of the wirings and do not cause the yield defect.

FIGS. 9A and 9B' are diagrams illustrating the concept of reliability defect. The foreign particle depicted in FIG. 8B is illustrated in FIG. 9A. The foreign particle grows, expands and causes failure as time elapses as shown in FIG. 9B'. This state is referred to as "reliability defect."

Thus, the "yield defect" observed by an inspection and the "reliability defect" being a factor of the initial reliability result from a physical and chemical phenomenon of the same kind. As illustrated in the figure, the "reliability defect" is smaller in scale than the "yield defect" and does not contribute to a yield defective.

Determining the correlation model between the expected number of defects of the yield defect and the probability of failures occurring in the initial reliability from experiments enables the initial reliability to be shown as a function of yield. The consideration of the result of analyzing the critical area which may cause reliability failure allows the above correlation model to be expanded to any library element. The models related to assumable all groups of "yield defect and reliability defect" are formed and combined together to enable the initial reliability of any library element to be predicted. The initial reliability can be predicted before production from the result of predicting the initial reliability of each library element and the layout information of a product if the defect density of yield defect of a product manufacturing process is observed.

Heretofore, a yield-reliability correlation has been modeled with respect to a finished product layout. Since the reliability test of a product depends on trade-off between quality and cost, a screening condition is set in consideration of the application of the product and required quality. Therefore, the reliability test of the product is generally conducted at two points of time: after the product is finished; and immediately before the product is shipped. The time interval of the two points of time is rendered a constant to calculate failure probability.

The above reliability prediction method is ex-post measures for a completed product. As essential measures, it is desirable that measures are initially created at a product stage to take measures such as designing a layout which is high in reliability.

According to the method of the present embodiment, a prediction model can be previously formed on a library element basis from the result of analyzing the critical area and the result of testing reliability using the test structure. Consequently, reliability can be predicted only from layout plan and information.

A determination is made as to whether the prediction result satisfies the required reliability and a product layout plan is reviewed, thereby enabling the realization of the product layout satisfying a desired initial reliability.

The reliability test is conducted using a circuit pattern, which does not affect a product quality and is advantageous in cost. For this reason, the reliability test can be repeated with time and the model reflecting more accurately the transition of time can be formed.

In the above method, when a previously manufactured product is subjected to a reliability test, a wasteful product manufacture is required to conduct the reliability test. On the other hand, according to the method of the present embodiment, the reliability of a product can be simulated before the product is completed. Therefore, there is no need for manufacturing the product only for the purpose of conducting the reliability test in designing the layout, which is advantageous in cost.

FIG. 10 is a flow chart illustrating a method of predicting the early-life failure rate of the semiconductor device, as a comparison example of the present invention. In this reliability prediction method, a defect inspection is conducted (S901) and a defect density is calculated from the result of the defect inspection (S902).

The critical area of the product is analyzed based on the result of the defect density to determine a critical area value (S903).

On the other hand, the lifetime of the product is predicted in parallel with the critical area analysis. The defect density related to yield is calculated to calculate the yield of the product (inspection yield) (S904) and the product is screened (reliability test) (S905). Conducting screening for a certain period of time before the product is shipped forms the correlation model between yield and reliability based on a parameter of time (S906). The correlation model described in IEEE Trans. on Reliability vol. 52, p. 296 (2003) by T. S. Barnett, et al. may be used herein.

The critical area value determined in step S903 and the parameter of the correlation model determined in step S906 are multiplied together to calculate the reliability of the product, enabling the reliability of the product to be predicted (S907).

In this method, the reliability test is conducted after the design of the product to form the correlation data between yield and reliability, which sometimes does not satisfy the required product quality. In that case, the design needs to be changed or the screening condition needs to be tightened so that a product satisfying the required quality can be extracted. In the former, re-design is required to waste cost and time. In the latter, a voltage higher than that necessary is applied to a device, so that the screening condition is sometimes excessive in reliability estimation. In this case, the lifetime of the device is shortened during the reliability estimation.

On the other hand, in the present invention, the reliability of a library element is predicted first and the library elements are combined together to construct a product, so that the reliability of the product can be predicted without an actual trial production. That can avoid situations where a designed product does not meet the required quality.

In the technique described in Japanese Patent Laid-Open No. 2007-123894, an individual library element used for forming a specific product is subjected to a critical area analysis to enable yield to be predicted from a product layout plan. However, there is no conventional art for realizing the prediction of occurrence of early-life failures.

The method of predicting the occurrence of early-life failures is needed at the time of planning a product layout from the viewpoint of the initial reliability of a semiconductor product being enabled to be predicted without the production of the product. Furthermore, if the initial reliability of a product can be predicted before the product is completed, a measure can be taken for increasing the reliability of the product at the time of designing the layout, allowing the decrease of production of wasteful semiconductor products. This is advantageous in cost.

It is apparent that the present invention is not limited to the above embodiments, and the embodiments can be modified and changed as appropriately within the scope of the technical concept of the present invention.

What is claimed is:

1. A method for predicting a reliability of a semiconductor device in which an early-life failure of the semiconductor device is predicted, the method comprising:
    calculating a defect density for each of wiring patterns, by using a computer;
    extracting a critical area for each of library elements including the wiring patterns based on the defect density for each of the wiring patterns;
    calculating a critical area value for each of the library elements from the critical area for each of the library elements;
    calculating an expected value of a defect occurrence for each of the wiring patterns from the defect density for each of the wiring patterns;
    determining a failure probability for each of the wiring patterns from a result of a reliability test for each of the wiring patterns;
    forming a model based on the failure probability for each of the wiring patterns and the expected value of defect occurrence for each of the wiring patterns;
    calculating a failure probability for each of the library elements from the critical area value for each of the library elements and a function of the model;
    designing a layout of the semiconductor device with a plurality of the library elements combined together; and
    calculating a reliability of the semiconductor device based on the failure probability for each of the library elements combined together,
    wherein the reliability test of each of the wiring patterns as time elapses is conducted by using a test structure for forming the result of the reliability test, and
    wherein the model is represented by a function γ (t) in equation $$\gamma(t) = F(t)/\lambda,$$

where F(t) is the failure probability for each the wiring patterns, and λ is the expected value of the defect occurrence.

2. The method for predicting the reliability of a semiconductor device according to claim 1, wherein the reliability is calculated as a joint probability of the failure probability of each of the library elements combined together in designing the layout of the semiconductor device.

3. The method for predicting the reliability of the semiconductor device according to claim 1, wherein the defect density denotes a density of a number of defects which cause failure on each of the wiring patterns.

4. The method for predicting the reliability of the semiconductor device according to claim 3, wherein the model includes:
    a first correlation model formed of a short-circuit defect density and the failure probability for each of the wiring patterns; and
    a second correlation model formed of an open defect density and the failure probability for each of the wiring patterns, wherein the failure probability for each of the library elements is calculated as a joint probability of the first and the second correlation models, wherein the short-circuit defect density represents a density of a number of defects which cause a short-circuit failure due to an adhesion of a foreign particle between the wiring patterns, and wherein the open defect density represents a density of a number of defects which cause an open failure due to an adhesion of a foreign particle on the wiring patterns.

5. The method for predicting the reliability of the semiconductor device according to claim 1, wherein the library element comprises an LSI (large-scale integration) circuit.

6. The method for predicting the reliability of the semiconductor device according to claim 1, wherein calculating the failure probability for each of the library elements comprises:
    calculating an expected value of defect occurrence for each of the library elements from the critical area value for each of the library elements; and
    calculating the failure probability for each of the library elements from the function of the model and the calculated expected value of defect occurrence for each of the library elements.

7. The method for predicting the reliability of the semiconductor device according to claim 1, further comprising:
    determining whether the calculated reliability of the semiconductor device satisfies a predetermined reliability.

8. A non-transitory storage medium storing a program executed by a computer for performing a method to predict early-life failures of a semiconductor device, the method comprising:
    calculating a defect density for each of wiring patterns;
    extracting a critical area for each of library elements including the wiring patterns based on the defect density for each of the wiring patterns;
    calculating a critical area value for each of the library elements from the critical area for each of the library elements;
    calculating an expected value of defect occurrence for each of the wiring patterns from the defect density for each of the wiring patterns;
    calculating a failure probability for each of the wiring patterns from a result of a reliability test for each of the wiring patterns;
    forming a model from the failure probability for each of the wiring patterns and the expected value of defect occurrence for each of the wiring patterns;
    calculating a failure probability for each of the library elements from the critical area value for each of the library elements and a function of the model; and
    calculating a reliability of the semiconductor device combined with a plurality of the library elements based on the failure probability for each of the library elements composing the semiconductor device,
    wherein the reliability test of each of the wiring patterns as time elapses is conducted by using a test structure for forming the result of the reliability test, and
    wherein the model is represented by a function γ (t) in equation $\gamma(t)=F(t)/\lambda$, where F(t) is the failure probability for each the wiring patterns, and λ is the expected value of the defect occurrence.

9. The non-transitory storage medium storing the program executed by the computer for performing the method to predict early-life failures of the semiconductor device according to claim 8, wherein the reliability is calculated as a joint probability of the failure probability of each of the library elements combined together in designing the layout of the semiconductor device.

10. The non-transitory storage medium storing the program executed by the computer for performing the method to predict early-life failures of the semiconductor device according to claim 8, wherein the defect density denotes a density of a number of defects which cause failure on the wiring pattern.

11. The non-transitory storage medium storing the program executed by the computer for performing the method to predict early-life failures of the semiconductor device according to claim 10, wherein the model includes:
    a first correlation model formed of a short-circuit defect density and the failure probability for each of the wiring patterns; and
    a second correlation model formed of an open defect density and the failure probability for each of the wiring patterns,
    wherein the failure probability for each of the library elements is calculated as a joint probability of the first and the second correlation models,
    wherein the short-circuit defect density represents a density of a number of defects which cause a short-circuit failure due to the adhesion of a foreign particle between the wiring patterns, and
    wherein the open defect density represents a density of a number of defects which cause an open failure due to the adhesion of a foreign particle on the wiring patterns.

12. The non-transitory storage medium storing the program executed by the computer for performing the method to predict early-life failures of the semiconductor device according to claim 8, wherein the library element comprises an LSI (large-scale integration) circuit.

13. The non-transitory storage medium storing the program executed by the computer for performing the method to predict early-life failures of the semiconductor device according to claim 8, the method further comprising:
    determining whether the calculated reliability of the semiconductor device satisfies a predetermined reliability.

14. The non-transitory storage medium storing the program executed by the computer for performing the method to predict early-life failures of the semiconductor device according to claim 13, the method further comprising:
    selecting again two or more library elements from a series of the library elements, and calculating the reliability of the semiconductor device including the selected library elements from the failure probability for each of the library elements, when the calculated reliability does not satisfy the predetermined reliability.

15. A semiconductor-device reliability predicting system for predicting early-life failures of a semiconductor device, the system comprising:
    a defect density calculating unit for calculating a defect density for each of wiring patterns;
    a critical area extracting unit for extracting a critical area for each of library elements including the wiring patterns based on the defect density for each of the wiring patterns, and calculating a critical area value for each of the library elements from the critical area for each of the library elements;
    a model forming unit for calculating a failure probability for each of the wiring patterns from a result of a reliability test for each of the wiring patterns, calculating an expected value of defect occurrence for each of the wiring patterns from the defect density for each of the wiring patterns, and forming a model based on the failure probability for each of the wiring patterns and the expected value of defect occurrence for each of the wiring patterns;

a failure probability calculating unit for calculating a failure probability for each of the library elements from the critical area value for each of the library elements and a function of the model; and a reliability calculating unit for calculating a reliability of the semiconductor device composed of a plurality of the library elements based on the failure probability for each of the library elements composing the semiconductor device, wherein the reliability test of each of the wiring patterns as time elapses is conducted by using a test structure for forming the result of the reliability test, and wherein the model is represented by a function $\gamma(t)$ in equation $$\gamma(t)=F(t)/\lambda,$$

where $F(t)$ is the failure probability for each the wiring patterns, and $\lambda$ is the expected value of the defect occurrence.

* * * * *